United States Patent
Palmer et al.

(10) Patent No.: US 11,615,441 B2
(45) Date of Patent: *Mar. 28, 2023

(54) MULTI-STAGE CONTENT ANALYSIS SYSTEM THAT PROFILES USERS AND SELECTS PROMOTIONS

(71) Applicant: Kaptivating Technology LLC, Los Angeles, CA (US)

(72) Inventors: Michael Palmer, Los Angeles, CA (US); Steven Tulk, Coto de Caza, CA (US); Thomas Galido, Los Angeles, CA (US)

(73) Assignee: Kaptivating Technology LLC, Los Angeles, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 16/708,898

(22) Filed: Dec. 10, 2019

(65) Prior Publication Data

US 2020/0118175 A1 Apr. 16, 2020

Related U.S. Application Data

(63) Continuation of application No. 16/272,790, filed on Feb. 11, 2019, now Pat. No. 10,528,984, which is a
(Continued)

(51) Int. Cl.
G06Q 30/0251 (2023.01)
G06Q 30/0241 (2023.01)
G06N 7/01 (2023.01)

(52) U.S. Cl.
CPC ........... *G06Q 30/0269* (2013.01); *G06N 7/01* (2023.01); *G06Q 30/0254* (2013.01); *G06Q 30/0255* (2013.01); *G06Q 30/0277* (2013.01)

(58) Field of Classification Search
CPC ........................................ G06Q 30/0207–0277
See application file for complete search history.

(56) References Cited

U.S. PATENT DOCUMENTS 8,326,688 B2  12/2012  Harrison et al.
9,189,514 B1  11/2015  Myslinski
(Continued)

FOREIGN PATENT DOCUMENTS

WO    WO2007024736    * 3/2007 .............. G06F 7/00

OTHER PUBLICATIONS

International Search Report and Written Opinion received in PCT/US18/57416, dated Nov. 29, 2018, 19 pages.
(Continued)

*Primary Examiner* — Kiersten V Summers
(74) *Attorney, Agent, or Firm* — Arc IP Law, PC; Joseph J. Mayo

(57) ABSTRACT

A system that analyzes a user's communications to select a promotion that is presented to the user. The analysis may occur in two stages: a first stage analyzes a single communication from a user to determine whether the user is a potential target for a promotion; for potential targets, a second stage analyzes a history of communications from the user to generate a user profile. The system may then select a promotion based on the profile. The profile may include a set of profile tags that are considerably more detailed and granular than traditional demographic data; tags may for example indicate user affiliations with groups or ideas (such as religions or political parties), or user life cycle stages. Using these rich, detailed user profile tags, the system may achieve promotion response rates far above those from traditional advertising, which relies on cookies or simple demographic categories.

18 Claims, 7 Drawing Sheets

Related U.S. Application Data continuation-in-part of application No. PCT/US2018/057416, filed on Oct. 24, 2018, which is a continuation of application No. 15/792,403, filed on Oct. 24, 2017, now abandoned.

(56) References Cited

U.S. PATENT DOCUMENTS

| | | | |
|---|---|---|---|
| 9,201,876 B1* | 12/2015 | Kumar | G06F 40/284 |
| 2002/0019764 A1* | 2/2002 | Mascarenhas | G06Q 30/02 |
| | | | 707/792 |
| 2002/0052781 A1 | 5/2002 | Aufricht et al. | |
| 2003/0154181 A1* | 8/2003 | Liu | G06K 9/6226 |
| 2004/0122656 A1* | 6/2004 | Abir | G06N 5/022 |
| | | | 704/4 |
| 2007/0055994 A1 | 3/2007 | Orihara | |
| 2008/0109491 A1 | 5/2008 | Gupta | |
| 2008/0201222 A1* | 8/2008 | Lahaix | G06Q 30/0269 |
| | | | 705/14.66 |
| 2008/0228598 A1 | 9/2008 | Leff et al. | |
| 2008/0281687 A1* | 11/2008 | Hurwitz | G06Q 30/0271 |
| | | | 705/14.1 |
| 2009/0037253 A1* | 2/2009 | Davidow | G06Q 30/0204 |
| | | | 705/7.33 |
| 2009/0037440 A1* | 2/2009 | Will | G06K 9/6219 |
| 2009/0112847 A1* | 4/2009 | Sim | G06Q 30/02 |
| | | | 707/999.005 |
| 2009/0150800 A1 | 6/2009 | Wood et al. | |
| 2009/0199108 A1* | 8/2009 | Bannister | G06Q 30/02 |
| | | | 715/747 |
| 2009/0240568 A1 | 9/2009 | Ramer et al. | |
| 2010/0312628 A1* | 12/2010 | Reid | G06Q 30/0217 |
| | | | 705/14.19 |
| 2011/0004574 A1 | 1/2011 | Jeong et al. | |
| 2011/0173225 A1 | 7/2011 | Stahl et al. | |
| 2012/0023006 A1* | 1/2012 | Roser | G06Q 40/00 |
| | | | 706/12 |
| 2012/0078709 A1* | 3/2012 | Dunham | G06Q 30/0242 |
| | | | 705/14.42 |
| 2012/0259619 A1* | 10/2012 | Hall | G06F 40/30 |
| | | | 704/9 |
| 2012/0323794 A1 | 12/2012 | Livshits | |
| 2013/0024407 A1* | 1/2013 | Thompson | G06F 40/253 |
| | | | 706/12 |
| 2013/0204701 A1* | 8/2013 | Calafiore | G06Q 50/01 |
| | | | 705/14.53 |
| 2013/0211915 A1* | 8/2013 | Tseng | G06Q 30/02 |
| | | | 705/14.54 |
| 2014/0172652 A1* | 6/2014 | Pobbathi | G06Q 10/087 |
| | | | 705/28 |
| 2014/0207518 A1 | 7/2014 | Kannan et al. | |
| 2014/0236941 A1* | 8/2014 | Johns | G06F 16/9566 |
| | | | 707/730 |
| 2014/0279906 A1* | 9/2014 | Peintner | G06Q 30/0201 |
| | | | 707/639 |
| 2014/0289006 A1 | 9/2014 | Palmer et al. | |
| 2015/0302317 A1 | 10/2015 | Norouzi et al. | |
| 2015/0334458 A1 | 11/2015 | Srinivasan et al. | |
| 2015/0372963 A1* | 12/2015 | Root | H04L 51/42 |
| | | | 709/206 |
| 2016/0147893 A1 | 5/2016 | Mashiach et al. | |
| 2017/0178184 A1 | 6/2017 | Brill et al. | |
| 2018/0197207 A1* | 7/2018 | Lee | G06Q 30/0201 |
| 2018/0301140 A1 | 10/2018 | Turcott et al. | |
| 2019/0102802 A1 | 4/2019 | Tuschman et al. | |

OTHER PUBLICATIONS

Notification of Search Copy received in PCT/US 18/57416, dated Oct. 24, 2018, 1 page.
Bruno Stecanella, A practical Explanation of a Naïve Bayes Classifier, May 25, 2017, Monkey Learn, 1-22 (2017).
Sebastian Raschka, Naïve Bayes and Text Classification I, URL Capture date of Oct. 7, 2014, Internet Archive Way Back Machine, 1-21 (2014).
Wikipedia, Feature (Machine Learning), URL capture date of Sep. 16, 2017, Internet Archive Way Back Machine, pp. 1-2 (2017).
International Preliminary Report on Patentability received in PCT/US18/57416, dated May 7, 2020, 16 pages.

* cited by examiner

MULTI-STAGE CONTENT ANALYSIS SYSTEM THAT PROFILES USERS AND SELECTS PROMOTIONS

This application is a continuation of U.S. patent application Ser. No. 16/272,790, filed 11 Feb. 2019, which is a continuation-in-part of PCT International Application No. PCT/US2018/057416, filed 24 Oct. 2018, which is a continuation of U.S. patent application Ser. No. 15/792,403, filed 24 Oct. 2017, the specifications of which are hereby incorporated herein by reference.

BACKGROUND OF THE INVENTION

Field of the Invention

One or more embodiments of the invention are related to the fields of data processing and online advertising. More particularly, but not by way of limitation, one or more embodiments of the invention enable a system that analyzes user-generated content, such as electronic messages or postings, and selects a promotion based on a user profile created from this analysis.

Description of the Related Art

Internet advertising systems attempt to present promotions to users that are likely to generate a positive user response. However, existing systems generally have very limited information on users and their interests. Promotions that are presented to users therefore typically have very low click-through rates, often below 0.1%. This problem of limited information is compounded by the proliferation of mobile devices, since traditional methods of user tracking such as storing cookies on the user's computer may be less effective when users communicate using a variety of devices. Even when users interact with a single device, cookies typically provide only a history of sites that a user has visited. Membership sites may attempt to collect information about users as part of registration, but this data is often limited or inaccurate, and is only available when a user is logged in. Detailed information on a user's interests and preferences is rarely available to advertisers.

A potential source of detailed information about users and their preferences is the history of the electronic communications (messages, tweets, postings, etc.) that each user has generated. The specific words and phrases that a user has employed may indicate topics of interest to the user, and may help categorize the user's style and background. This communications history data has generally not been effectively analyzed by existing advertising systems. Moreover, since it may be impractical to continuously analyze a user's entire communications history, it may be desirable to use a multi-stage process that for example first determines that a user is a potential promotion target, and then analyzes the communications history to build a detailed user profile.

For at least the limitations described above there is a need for a multi-stage content analysis system that profiles users and selects promotions.

BRIEF SUMMARY OF THE INVENTION

One or more embodiments described in the specification are related to a multi-stage content analysis system that profiles users and selects promotions. Embodiments may develop a user profile based on analysis of the user's communications history, and use this profile to select a promotion to present to the user. Because the profile developed from the communications history may include rich, detailed information about the user, response rates to promotions selected by embodiments of the invention may be much higher than the very low response rates (0.1% or less) from traditional advertising; in testing, some embodiments of the invention have achieved response rates above 40%.

One or more embodiments of the invention may include three major components: a first analysis stage that analyzes a specific communication from a user, and determines whether the user may be a potential target for a promotion; a second analysis stage that analyzes an entire communications history for the user (which may include multiple messages over time) in order to build a user profile that may associate one or more profile tags with the user; and a promotion selector that selects a specific promotion based on the profile tags, and presents this promotion to the user. The second analysis stage may be executed only if the first analysis stage determines that the user is a potential target.

User profile tags may be any type of data that describes any attribute or aspect of the user or of the user's communications. For example, without limitation, profile tags may describe one or more affiliations with an organization, a group, a cause, or a belief. Examples of affiliation tags may include, without limitation, religious affiliation, or political affiliation (for example with a political party, a political viewpoint, or a political candidate). User profile tags may also for example be associated with life cycle stages of the user, such as for example, without limitation, stages such as teenager, prospective student, student, new graduate, early adult, expectant spouse, new spouse, expectant new parent, new parent, expectant empty nester, empty nester, senior, grandparent, expectant retiree, and retiree.

To generate user profile tags, one or more embodiments may access a database of key words and phrases associated with each potential tag, and compare this database to the words and phrases in the communications history. A frequency count for each word and phrase within the history may be calculated, and these frequency counts may be used to calculate a tag relevance score for each tag. An illustrative method for calculating relative tag relevance that may be used in one or more embodiments is a naïve Bayes classifier, which uses the word and phrase frequencies as feature vectors and calculates the probability that the communications history is associated with each profile tag.

One or more embodiments may include a third analysis stage, which may modify or extend the user profile tags generated in the second analysis stage. This third stage may access one or more external databases of user profile information, instead of or in addition to analyzing the user's communications history. The third analysis stage may be invoked only if the second analysis stage determines that the user continues to be a potential target for a promotion.

One or more embodiments may use machine learning to improve the performance of any or all of the first analysis stage, the second analysis stage, the third analysis stage (if present) and the promotion selector. A machine learning engine may use training data that may for example indicate how or whether users responded to promotions, or the purchases, subscriptions, enrollments or other actions taken by these users. For embodiments that associate words and phrases with user profile tags, the machine learning engine may modify these associations to improve response performance. For example, a machine learning engine may use the training data to learn the parameters of a naïve Bayes classifier that maps the communications history into user profile tags.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A multi-stage content analysis system that profiles users and selects promotions will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
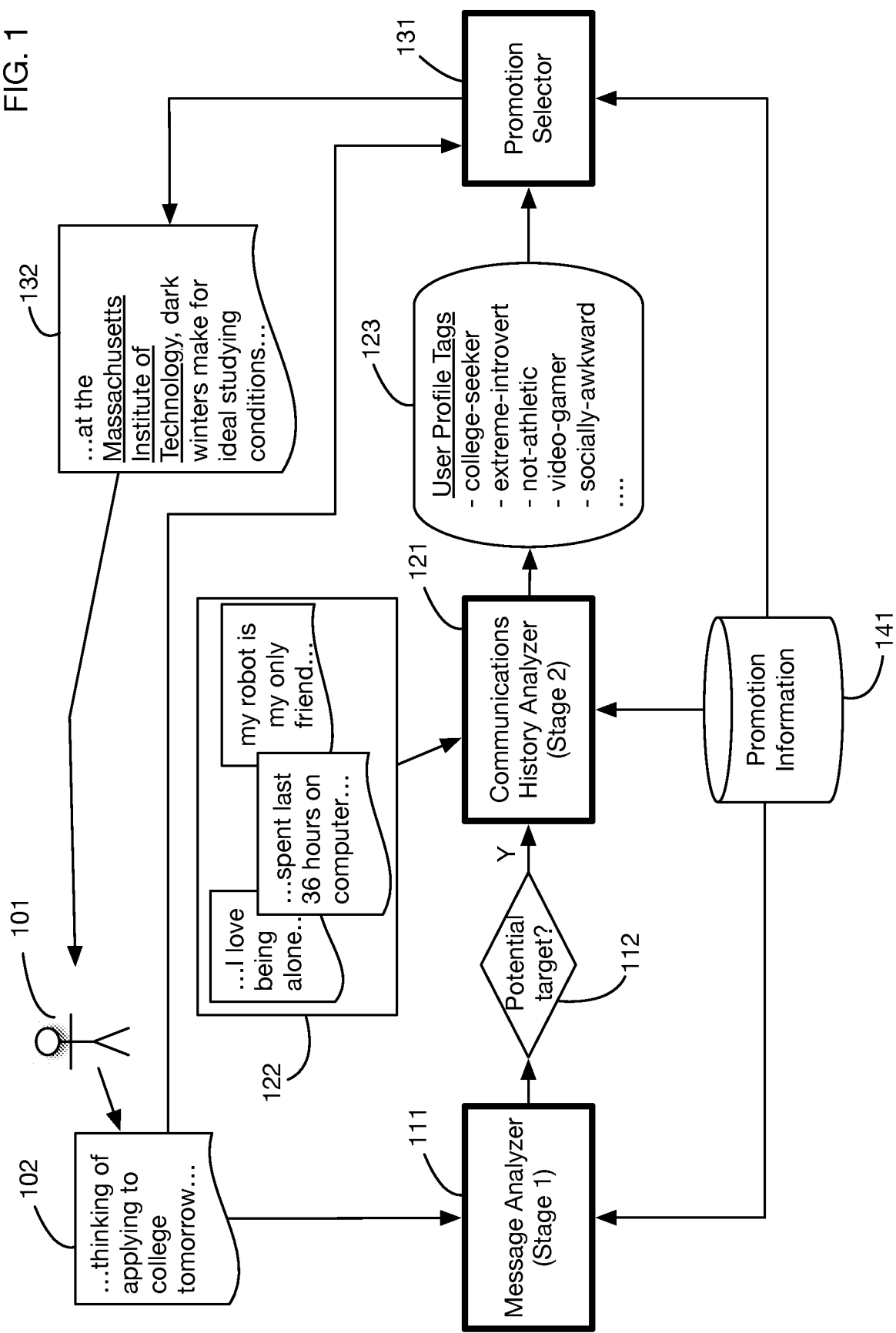
FIG. 1 shows an architectural block diagram of a multi-stage content analysis system with a first stage that determines whether a user is a potential promotion target, a second stage than analyzes the user's communications history to build a user profile, and a promotion selector that selects a promotion to present to the user.

FIG. 1 shows an architectural block diagram of an illustrative embodiment of the invention. This system selects a promotion 132 to transmit to a user 101, based on an analysis of the user's communications. The system generally attempts to select a promotion that is most likely to lead to a positive response from the user, where a response may for example be a clickthrough or some other action. Initially user 101 generates a communication 102, which may trigger the system's analysis to determine whether a promotion should be provided as a response. In one or more embodiments, communication 102 may be any type of message or information, including for example, without limitation, a text message, a tweet, an email message, a voice message, a chat message, a fax, an Instagram™, an image, a video, a posting on a social media site or any other site, a blog entry, a comment, a response to or comment on another message or posting, a forwarding of another communication, or data entry into a form or field. In a first stage of analysis, Message Analyzer 111 receives communication 102 and analyzes it to determine whether the user may be a potential target for one or more promotions. Promotion information about various promotions may available for example in database 141. This database may include information on the potential promotions, and information that indicates how to determine which promotion or promotions may be an appropriate response to a communication. Initial analysis stage 111 may in one or more embodiments analyze the text of communication 102 to match this text against promotion information 141. For example, without limitation, this first stage of analysis may scan the text of communication 102 for specific key words or phrases that suggest that the user may be a target for a promotion. As an illustration, in the example of FIG. 1 the text "applying to college" in message 102 may suggest to Message Analyzer 111 that the user may be a prospective college student, and may therefore be appropriate for one or more promotions by colleges seeking to promote their institutions to prospective applicants. In one or more embodiments, Message Analyzer 111 may use any method or methods to determine whether a message indicates a potential target for a promotion, including but not limited to text analysis, natural language processing, keyword matching, or artificial intelligence. In one or more embodiments, the Message Analyzer 111 may use additional information such as the identity of the user or any other contextual data to assess whether the user is a potential target. The determination of whether a user is a potential target may depend on the type of promotion; for example, for products and services, a potential target may be a user who appears to be "in the market" for the relevant category of products and services associated with one or more promotions. Message analyzer 111 may for example be implemented on a computer or computer that is specifically programmed to process information.

Message Analyzer 111 may make a determination 112 as to whether the user 101 appears to be a potential target for a promotion, based on the first stage of analysis. If the user does appear to be a potential target, in one or more embodiments a second analysis stage 121 may then be performed in more detail to generate a profile of the user. A second analysis stage may also confirm or reject the initial hypothesis that the user is a viable promotion target. The second analysis stage may for example be a Communications History Analyzer 121, which may obtain and analyze a communications history 122 that the user has generated over time. Like the initial communication 102, in one or more embodiments the communications history 122 may include any type or types of communications, including for example, without limitation, text messages, tweets, email messages, voice messages, chat messages, faxes, an Instagrams™, images, videos, postings on social media sites or any other sites, blog entries, comments, responses to or comments on other messages or postings, forwarding of other communications, or data entry into forms or fields.

Communications History Analyzer 121 for example a computer or computer that is specifically programmed to process information analyzes communications history 122 and generates one or more user profile tags 123 that describe characteristics of the user and the user's communications. This analysis may also use information 141 about promotions. User profile tags may include any qualitative or quantitative data describing the user or the user's communications. Tags may be organized in any desired manner, such as for example in a hierarchy of groupings. In one or more embodiments, data may be associated with the profile tags, such as for example a probability that a specific tag applies to the user. Communications History Analyzer 121 may use any desired method or methods to derive tags 123 from the communications history 122. For example, without limitation, certain tags may be associated with specific key words or phrases, and the analysis may include searching for these key words and phrases in the communications history 122.

User profile tags 123 may then be input into a Promotion Selector 131 that selects a specific promotion from the available promotions in database 141. The Promotion Selector may also further analyze the user's current communication 102. In one or more embodiments, the Promotion Selector may also make a determination as to whether any promotion should be provided to the user. For example, if the user profile tags do not contain tags relevant to any promotions, no promotion may be selected, or a random promotion may be selected (for example to assist with machine learning, as described below). In one or more embodiments, the Promotion Selector 131 may select multiple promotions for a user, and may present these promotions to the user sequentially, in parallel, or randomly. The Promotion Selector may use the profile tags 123 to determine which promotion or promotions are most appropriate or valuable for the user, or are most likely to generate a desired response. This determination may for example be based on the user's apparent interests or demographics, or on the style of communication the user has used in communications history analyzer 121. In the example illustrated in FIG. 1, promotion information 141 may for example include promotions from a number of different colleges seeking applications; the profile tags 123 are used to match the user to the college or colleges that align best with that user's interests or characteristics. Selected promotion 132 is then transmitted to user 101. In one or more embodiments, the promotion 132 may be transmitted in any desired manner, including for example, without limitation, as a text message, email message, tweet, posting, banner ad, coupon, or media feed. A promotion message 132 may be sent in any desired format and from any sender. The promotion message 132 may be transmitted as a response to message 102, or as an independent communication without a reference to the original user communication 102. Promotion 132 may be transmitted immediately to user 101, or it may be transmitted after a delay so that the user is not overwhelmed or confused by an immediate reaction to the user's communication 102.

Figure 2:
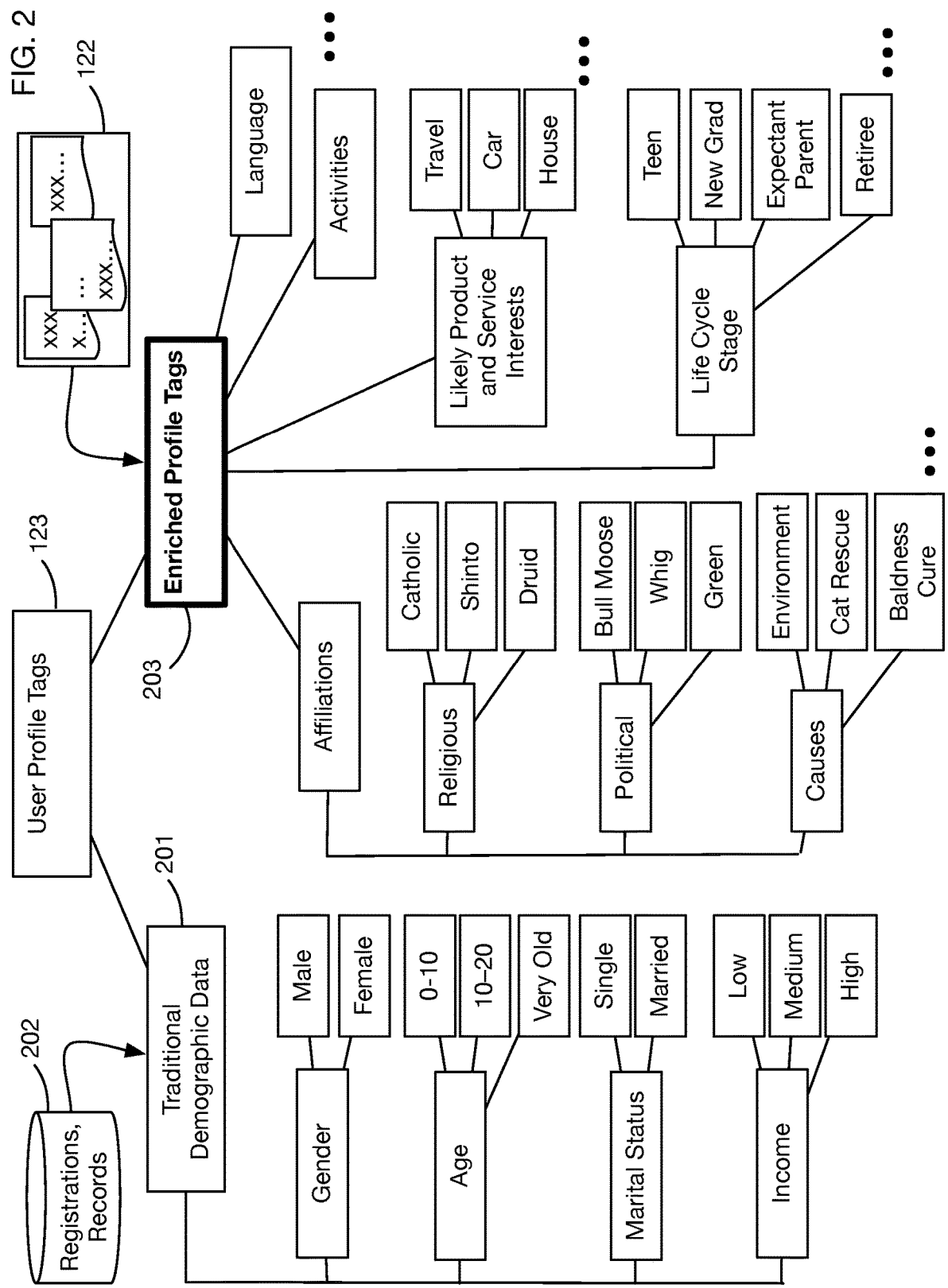
FIG. 2 shows illustrative user profile tags that may be generated from an analysis of the user's communications history.

User profile tags generated by the Communications History Analyzer 121 may include highly detailed information about the user that far exceeds traditional demographic user data. Generating this detailed information is possible because the user's communications history is analyzed directly; the system does not need to rely on traditional data sources such as user registration data. FIG. 2 illustrates this advantage of enriched user profile tags over traditional demographic data. User profile tags 123 may include traditional demographic data 201, such as gender, age, marital status, and income. This demographic data may be derived from communications history, or it may be obtained from data sources such as registration databases and user demographic records 202. However, by analyzing communications history 122, one or more embodiments of the invention may also generate enriched profile tags 203 with potentially fine-grained information about the user and the user's preferences and interests. FIG. 2 illustrates some potential enriched profile tags; these examples are illustrative and are not limiting for the types of profile tags that may be generated. For example, enriched profile tags derived from communications history may include information about the user's affiliations. Affiliations may for example include affiliation with any organization, group, cause, or belief. For example, affiliations may include religious beliefs or groups, political beliefs, or affiliation with causes or charities. Political affiliations for example may include affiliation with a political party, a political viewpoint, or a political candidate. As an illustration of how these affiliations may be useful, analysis of communications history 122 may determine that a user is a potential voter for a particular candidate, or that the user is affiliated with causes that a candidate supports; this user may then be targeted with promotions that encourage the user to support or vote for the candidate. As a second example, analysis of communications history 122 may determine that a user has certain religious beliefs; religious organizations or religiously-affiliated entities (such as Catholic schools for example) may then target that user with promotions.

Enriched profile tags 203 may also include tags that describe aspects of the user's life cycle stage. These life cycle stage tags may be more granular and descriptive than simple age categories. For example, they may indicate certain key life events that are imminent for the user, that have recently occurred, or that are currently occurring. These events might include for example, without limitation, graduation, beginning or ending work or a job, parenthood, marriage, grandparenthood, or retirement. Life cycle stage tags may for example include, without limitation, tags such as teenager, prospective student, student, new graduate, early adult, expectant spouse, new spouse, expectant new parent, new parent, expectant empty nester, empty nester, senior, grandparent, expectant retiree, and retiree.

Enriched profile tags 203 may also characterize the user's language, which may include the language or languages spoken or understood by the user and the particular communication style or level the user prefers. These tags may assist in selecting promotions that match the user's preferred or comfortable communication style. Tags may also describe the user's activities and interests, and the types of products and services the user may be interested in. These examples of tags are not limiting; one or more embodiments may generate any type of tags to describe any aspects of the user or of the user's communications, such as for example activities, preferences, ideas, relationships, knowledge, background, education, status, purchases, searches, inquiries, positions, styles, location, or origin.

Figure 3:
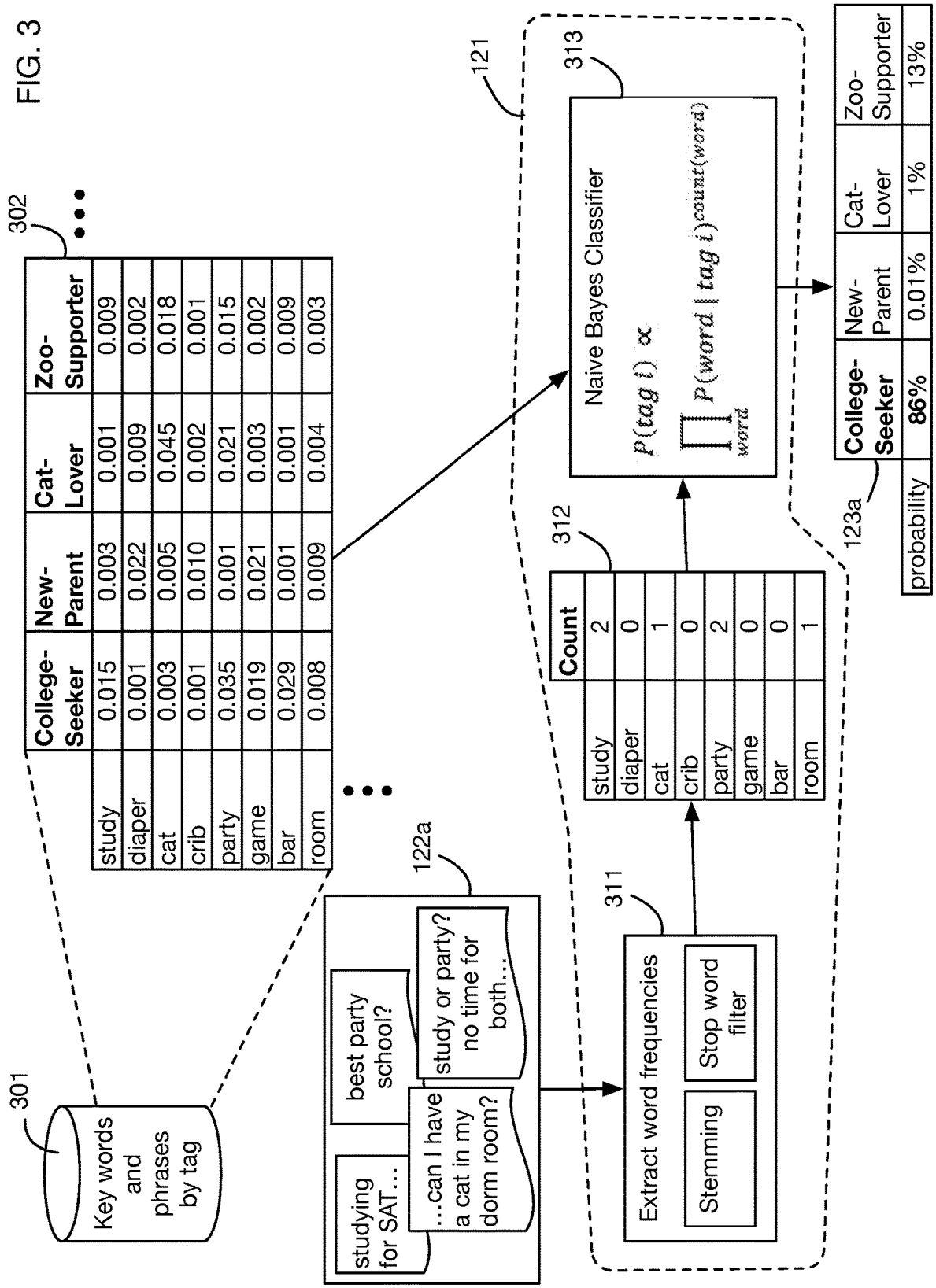
FIG. 3 shows an illustrative method for generating user profile tags that may be used in one or more embodiments; this method uses a naïve Bayes classifier to map the words and phrases of the communications history into probabilities associated with profile tags.

Profile tags may be generated using any desired method or methods. FIG. 3 illustrates a method that may be used in one or more embodiments; this illustrative method uses a naïve Bayes classifier to classify the user's communications history 122a into one or more categories. A "category" in this example is synonymous with a user profile tag. The illustrative example shown in FIG. 3 shows four categories (each corresponding to a user profile tag) for ease of illustration; one or more embodiments may classify the history into any desired number of categories. A database 301 associates key words and phrases with tags (categories). In this example, the database 301 contains a table 302 that provides a probability for each word (or phrase) in the database relative to each category. The Communications History Analyzer 121 ingests communications history 122a, and extracts word frequencies 312 from the history using procedure 311. The word frequency extractor may in one or more embodiments include other procedures such as stemming (for example, converting the word "studying" to the stem "study") and stop word filtering (for example, ignoring common words such as "a", "in", etc.). The word frequencies 312 are then processed using probability table 302 via classification algorithm 313, resulting in category probabilities 123a for the communications history. In this example, the "College-Seeker" category has the highest probability, so it may be assigned as a tag for the communications history. One or more embodiments may assign multiple tags, for example if there are several tags with relatively high probabilities, or no tags at all if no tag has a probability above a threshold value.

In one or more embodiments, the naïve Bayes classification calculation 313 may also include a priori probabilities for the individual categories; these a priori probabilities may be obtained from various sources such as a corpus of documents, external databases, or expert opinions. In one or more embodiments, the probability calculations may be performed as logarithms, which is equivalent to taking a weighted sum of the log-probabilities of the words in each category.

The naïve Bayes classifier shown in FIG. 3 is an illustrative method; one or more embodiments may use any type of classifier or any other algorithm to assign tags to a communications history. Classifiers may be probabilistic or non-probabilistic; tags may or may not be assigned with probabilities or confidence levels. One or more embodiments may also consider other features derived from the communications history to perform classification, instead of or in addition to the presence or count of individual words or phrases. For example, one or more embodiments may use n-grams of any length as features. One or more embodiments may use natural language processing to parse and analyze the communications. One or more embodiments may take into account word or n-gram positions for classification or assignment of tags. One or more embodiments may weight words, phrases, or n-grams differently across different messages in a communications history; for example, more recent messages may be assigned higher weights. One or more embodiments may weight words, phrases, or n-grams differently depending on their position within a message; for example, title words for a message may be given higher weight than the message text.

Figure 4:
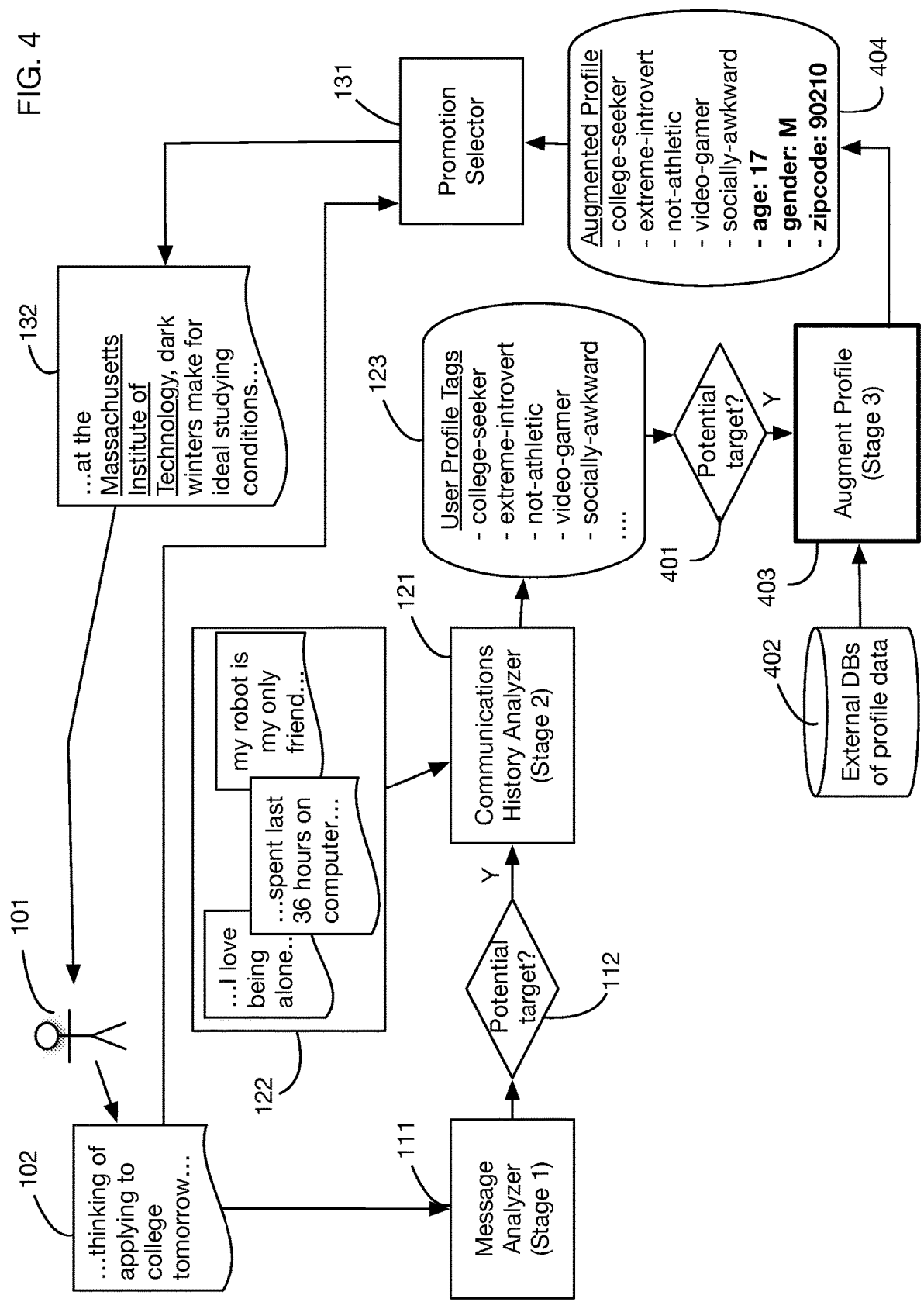
FIG. 4 shows an extension of the system of FIG. 1 that adds a third analysis stage that ingests external user profile data.

One or more embodiments may incorporate additional stages or features into the architecture illustrated in FIG. 1. FIG. 4 illustrates an extension of the architecture of FIG. 1 that includes a third analysis stage. After Communications History Analyzer 121 generates user profile tags 123, a determination may be made as to whether the user still appears to be a potential target 401 for a promotion. If so, a profile augmentation stage 403 may be executed to obtain and analyze additional user profile information. For example, this stage may access external databases 402 that may contain user information. In some situations, access to these external data sources may be costly; therefore, it may be valuable to obtain this data only when the first two analysis stages (111 and 121) indicate that the user may be an attractive promotion target. The Augment Profile stage 403 adds information to user profile tags 123, resulting in an augmented user profile 404. The augmented profile may for example include information obtained from or derived from external data sources 402. User profile tags 123 may be combined with external data in any desired manner; for example, analysis of the user's communications history 121 may suggest a user's life cycle stage, and external data may have a user's age or age category that may be correlated with or compared to this life cycle stage. The Promotion Selector 131 may then use the augmented profile 404 to select a promotion 132 for transmission to the user.

Figure 5:
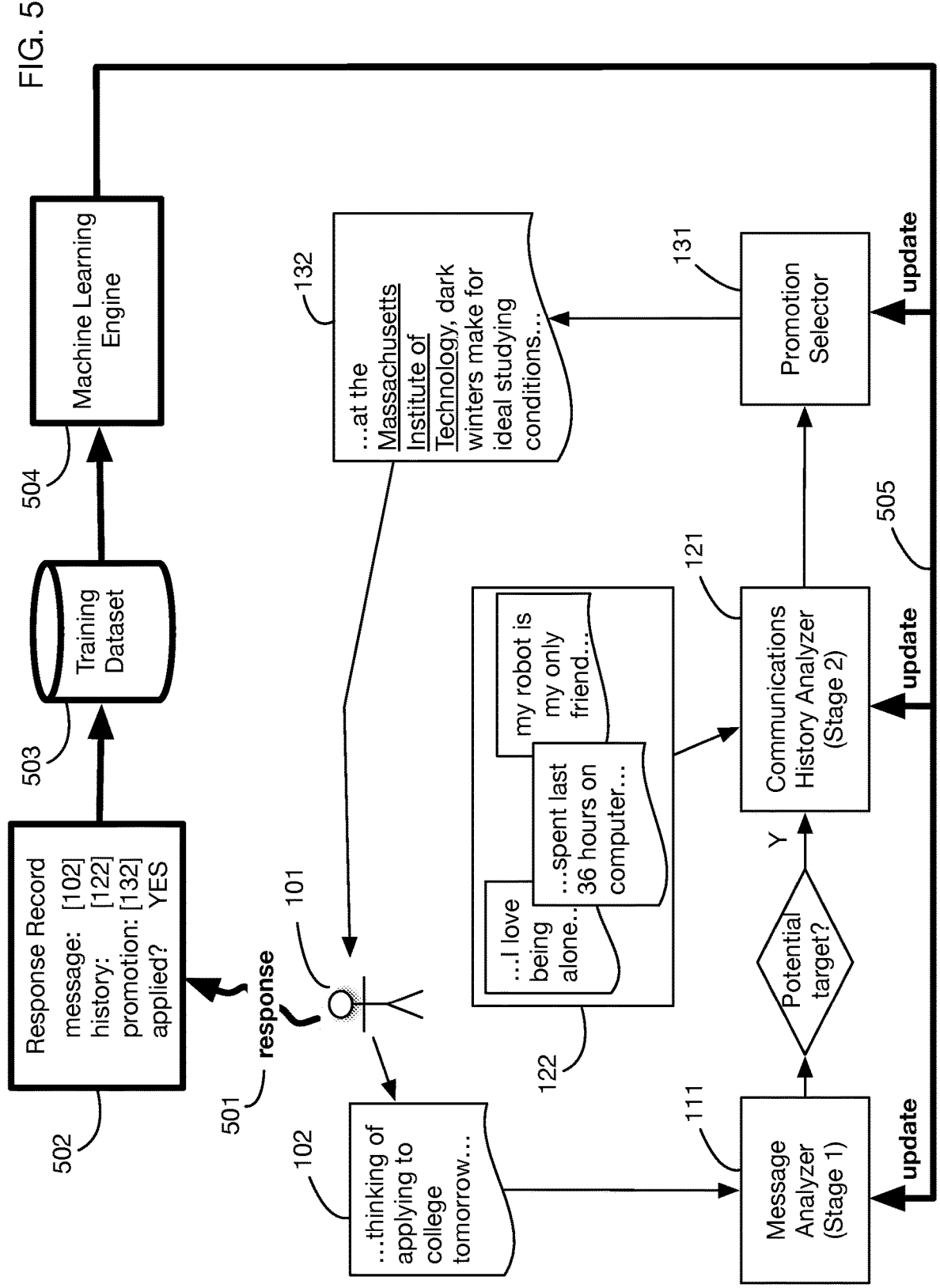
FIG. 5 shows an extension of the system of FIG. 1 that incorporates a machine learning engine that analyzes responses to promotions in order to update the analysis or promotion selection stages.

FIG. 5 illustrates another extension of the architecture of FIG. 1; this extension incorporates a machine learning engine into the system. In this illustrative embodiment, the response 501 (or lack of response) of user 101 to promotion 132 is tracked along with the message 102 and communications history 122 that were analyzed to select the promotion; these data may for example be incorporated into a response record 502. This response record, along with other response records from other users and other promotions (or from other data sources), are assembled into a training dataset 503 that may be used to train a Machine Learning Engine 504. The Machine Learning Engine 504 may learn or refine models that may be applied to update 505 any or all of the methods and algorithms used by the Message Analyzer 111, the Communications History Analyzer 121, and the Promotion Selector 131. With this closed-loop feedback system that incorporates response tracking and machine learning, the effectiveness of the system at selecting promotions to which users will respond may increase over time. For example, the training dataset 503 may indicate which promotions are associated with positive responses from users having certain user profile tags, which may improve promotion selection for future communications. One or more embodiments may use any source of training data, including but not limited to response data from users that have previously interacted with the system. For example, training data may include records of user purchases, subscriptions, installations, downloads, logins, clicks, registrations, or any other activity or activities of interest. Training data may include any information about users, including but not limited to the users' communications histories. Training data may indicate whether users responded to previous promotions or situations, and how they responded if they responded. Training data may include synthesized examples as well as real examples.

Figure 6:
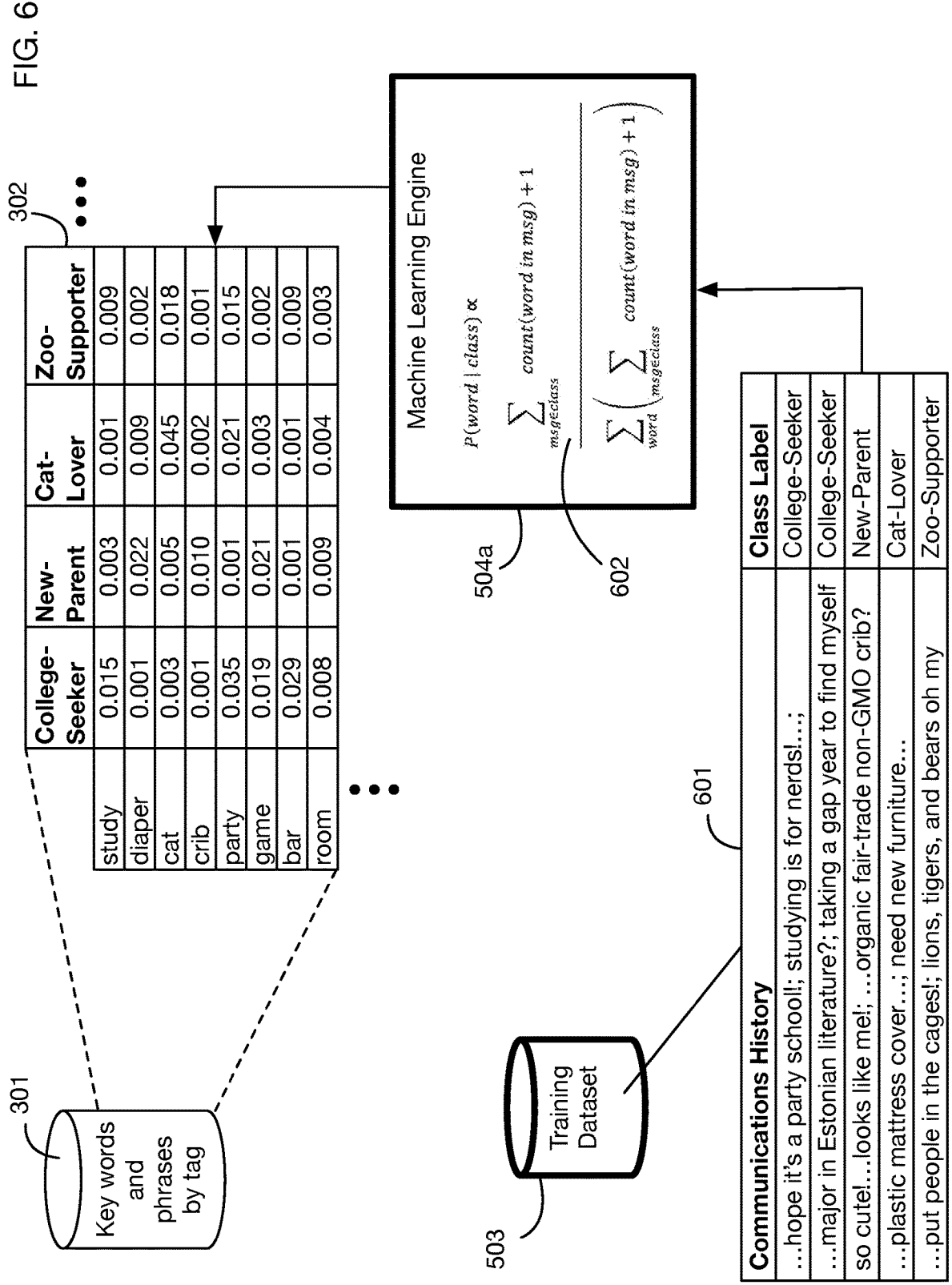
FIG. 6 shows an illustrative machine learning engine that learns probabilities using a multinomial naïve Bayes classifier.

One or more embodiments may use any desired machine learning techniques to learn from a training dataset, including for example, without limitation, supervised or unsupervised learning, regression, logistic regression, classifiers, neural networks, clustering, dimension reduction, or support vector machines. FIG. 6 illustrates a machine learning engine that learns the parameters of a naïve Bayes classifier, such as the classifier described above with respect to FIG. 3. Training dataset 503 may for example contain labeled examples 601, each of which contains a communications history and a corresponding class label. This training data 601 is input into a naïve Bayes classifier machine learning engine 504a, which applies algorithm 602 to calculate the probabilities 302 of each word within each class. This illustrative algorithm 602 uses a multinomial distribution model with Laplace smoothing; one or more embodiments may use any desired algorithm to learn any set of parameters from the training dataset 503.

Figure 7:
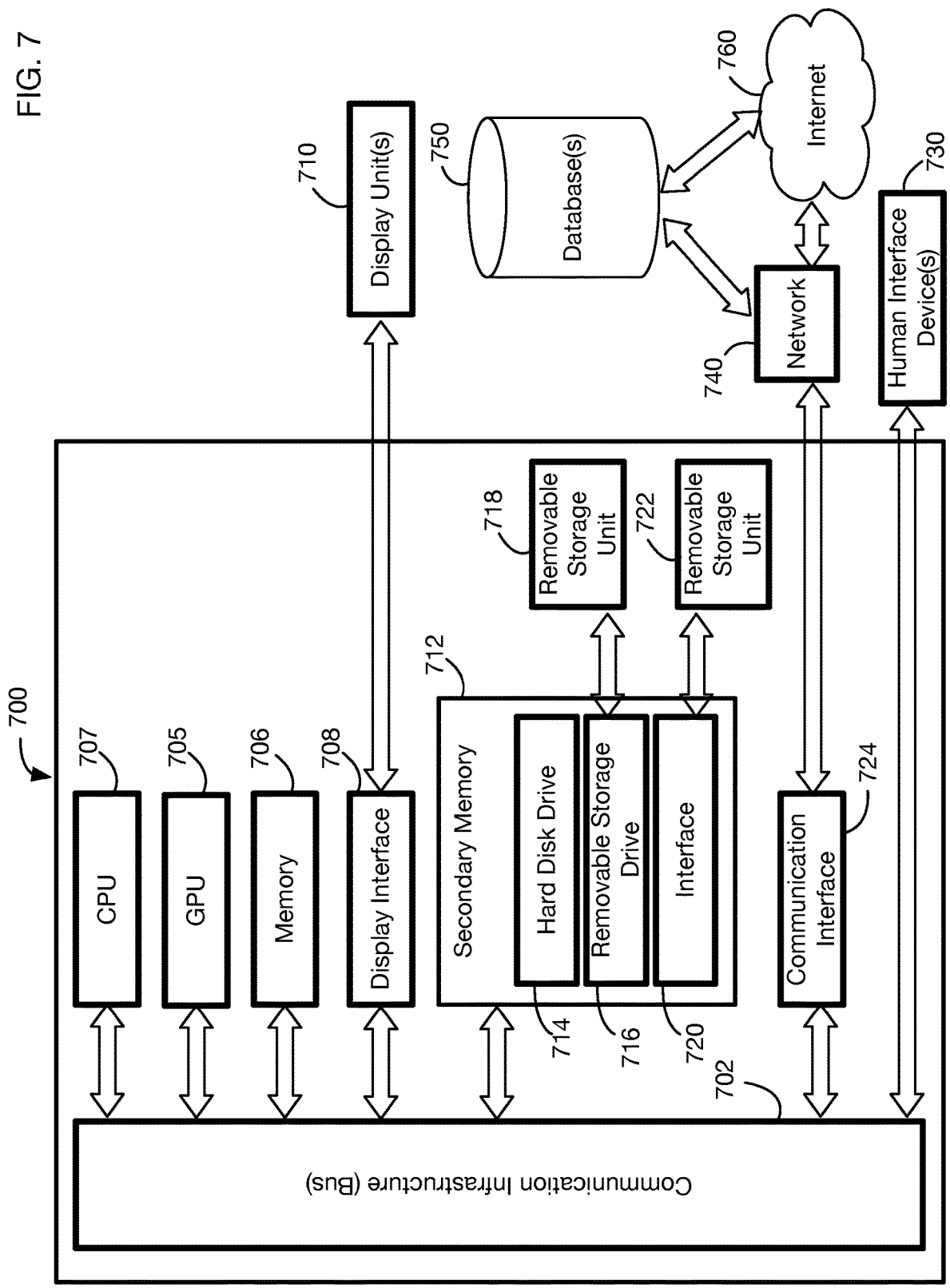
FIG. 7 shows illustrative computer hardware that may be incorporated into one or more embodiments of the system and may be used to execute any or all of the functions of the system.

All stages are performed using a computer having memory and specific instructions to perform each stage of the processing in one or more embodiments of the invention. FIG. 7 shows exemplary computer 700 that may be utilized in, by, or as any component in the system described herein, according to one or more embodiments of the invention. In other words, for example, in at least one embodiment of the invention, any component, element, structure, method, function, classifier and engine described herein may be done, include or used by computer 700 and the elements thereof shown in FIG. 7. In at least one embodiment, computer 700 may be used for example to execute or host any or all of Message Analyzer 111, Communications History Analyzer 121, Promotion Selector 131, and Machine Learning Engine 504. In one or more embodiments, computer 700 may be a network of computers, each of which may have any or all of the components shown in FIG. 7. In one or more embodiments, computer or computers 700 may also be utilized to implement any function in the system, i.e., any step or act or function that executes in any computer or server or engine in the system. In at least one embodiment of the invention, computer 700 may include processor CPU 707 that executes software instructions specifically tailored to the respective functions of embodiments of the invention. By way of at least one embodiment, the software instructions, such as computer program instructions, may reside within memory 706. In at least one embodiment, computer 700 may include processor GPU 705, which may execute graphics instructions or other instructions for highly parallel operations, for example. GPU program instructions may also reside within memory 706, according to one or more embodiments of the invention. In at least one embodiment, computer 700 may include display interface 708, which may drive display unit or units 710 of any computer in the system as desired. In one or more embodiments, some computers 700 may or may not utilize a display. Computer 700 may include communication interface 724, which may include wireless or wired communications hardware protocol chips, according to at least one embodiment. In one or more embodiments of the invention, communication interface 724 may include telephonic and/or data communications hardware. In one or more embodiments, communication interface 724 may include a Wi-Fi™ and/or BLUETOOTH™ wireless communications interface. Any wireless network protocol or type may be utilized in embodiments of the invention. In at least one embodiment, CPU 707, GPU 705, memory 706, display interface 708, communication interface 724, human interface devices 730, secondary memory 712, such as hard disk 714, removable storage 716, secondary memory interface 720 and removable storage units 718 and 722 may communicate with one another over communication infrastructure 702, which is commonly known as a "bus". By way of at least one embodiment, communications interface 724 may communicate over any wired or wireless medium that allows for communication with other wired or wireless devices over network 740. In one or more embodiments, network 740 may communicate with Internet 760 and/or database or databases 750. According to one or more embodiments of the invention, database 750 may be utilized to implement any database described herein, including for example Promotion Information 141, Registrations and Records 202, Key Words and Phrases 301, and External Databases of Profile Data 402, and Training Dataset 503.

While the invention herein disclosed has been described by means of specific embodiments and applications thereof, numerous modifications and variations could be made thereto by those skilled in the art without departing from the scope of the invention set forth in the claims.

What is claimed is:

1. A multi-stage content analysis system that profiles users and selects promotions, comprising:
 a computer comprising a memory and instructions within said memory, wherein said computer is configured to execute said instructions to
  receive a communication created by a user;
  analyze said communication to determine whether said user is a potential target for one or more promotions, wherein said analyze said communication comprises
   access a database comprising promotion information that comprises information that indicates how to determine which promotion of said one or more promotions is an appropriate response to said communication,
   scan the communication and match said communication against said promotion information in said database using one or more of text analysis, natural language processing, keyword matching or artificial intelligence,
   wherein said determine whether said user is said potential target for said one or more promotions depends on a type of said one or more promotions,
   wherein when said communication matches said promotion information, a determination is made by said computer that said user is said potential target for said one or more promotions;
  based on and in response to said analyze said communication, when said computer determines that said user is said potential target for a promotion
   receive a communications history associated with said user, wherein said communications history comprises a plurality of communications created by said user; and,
  when said computer receives said communication history based on when said computer determines that said user is said potential target for said one or more promotions
   analyze said communications history to confirm or reject said determination that said user is said potential target for said one or more promotions, wherein said confirm or reject comprises
    assign one or more user profile tags to said user, wherein said analyze said communications history to assign said one or more user profile tags to said user comprises
     access said database of promotion information comprising key words and phrases associated with each tag of a set of one or more tags;
     calculate a frequency of each of said key words and phrases in said communications history;
     calculate a tag relevance score for each tag of said set of one or more tags based on said frequency of each of said key words and phrases, wherein said calculate said tag relevance score for each tag of said set of one or more tags comprises
      calculate a probability that said communications history is associated with each tag of said set of one or more tags using a naïve Bayes classifier, wherein said frequency of each of said key words and phrases in said communications history comprises a feature vector for said naïve Bayes classifier; and,
   receive said one or more user profile tags;
  based on and in response to said analyze said communications history and in response to said receive said one or more user profile tags,
   analyze said one or more user profile tags and said communication to determine whether any promotion of said one or more promotions should be provided to the user,
    wherein when the one or more user profile tags do not contain tags relevant to any promotions,
     no promotion is selected, or
     a random promotion is selected to assist with machine learning,
    wherein when the one or more user profile tags do contain tags relevant to said any promotions, select a specific promotion from said one or more promotions; and,
transmit said specific promotion to said user.

2. The multi-stage content analysis system of claim 1, wherein said one or more user profile tags comprise one or more affiliations of said user with an organization, group, cause, or belief.

3. The multi-stage content analysis system of claim 2, wherein said organization, group, cause, or belief comprises a religion.

4. The multi-stage content analysis system of claim 2, wherein said organization, group, cause, or belief comprises a political party, a political viewpoint, or a political candidate.

5. The multi-stage content analysis system of claim 1, wherein said one or more user profile tags comprise one or more life cycle stages associated with said user.

6. The multi-stage content analysis system of claim 5, wherein said one or more life cycle stages comprise one or more of teenager, prospective student, student, new graduate, early adult, expectant spouse, new spouse, expectant new parent, new parent, expectant empty nester, empty nester, senior, grandparent, expectant retiree, and retiree.

7. The multi-stage content analysis system of claim 1, wherein said computer is further configured to:
 access an external database of user profile information;
 modify or extend said one or more user profile tags based on said external database.

8. The multi-stage content analysis system of claim 1, further comprising:
 a machine learning engine configured to
  receive data describing one or more of
   whether said user responded to said specific promotion that was transmitted to said user;
   how said user responded to said specific promotion;
   purchases, subscriptions, or enrollments made by said user; and,
  execute a machine learning algorithm on said data.

9. The multi-stage content analysis system of claim 8, wherein
 said machine learning algorithm is configured to modify said key words and phrases associated with one or more of said set of one or more tags.

10. A multi-stage content analysis system that profiles users and selects promotions, comprising:
 a computer comprising a memory and instructions within said memory, wherein said computer is configured to execute said instructions to
  receive a communication created by a user;
  analyze said communication to determine whether said user is a potential target for one or more promotions, wherein said analyze said communication comprises
   access a database comprising promotion information that comprises information that indicates how to determine which promotion of said one or more promotions is an appropriate response to said communication,
   scan the communication and match said communication against said promotion information in said database using one or more of text analysis, natural language processing, keyword matching or artificial intelligence,
   wherein said determine whether said user is said potential target for said one or more promotions depends on a type of said one or more promotions,
   wherein when said communication matches said promotion information, a determination is made by said computer that said user is said potential target for said one or more promotions;
  based on and in response to said analyze said communication, when said computer
   determines that said user is said potential target for a promotion receive a communications history associated with said user,
    wherein said communications history comprises a plurality of communications created by said user; and,
   when said computer receives said communication history based on when said computer determines that said user is said potential target for said one or more promotions
    analyze said communications history to confirm or reject said determination that said user is said potential target for said one or more promotions,
    wherein said confirm or reject comprises
     generate one or more user profile tags that describe characteristics of the user, wherein said one or more user profile tags are organized in a hierarchy of groupings,
     assign said one or more user profile tags to said user, wherein said analyze said communications history to assign said one or more user profile tags to said user comprises
      access said database of promotion information comprising key words and phrases associated with each tag of a set of one or more tags;
      calculate a frequency of each of said key words and phrases in said
      calculate a tag relevance score for each tag of said set of one or more tags based on said frequency of each of said key words and phrases, wherein said calculate said tag relevance score for each tag of said set of one or more tags comprises
       calculate a probability that said communications history is associated with each tag of said set of one or more tags using a naïve Bayes classifier, wherein said frequency of each of said key words and phrases in said communications history comprises a feature vector for said naïve Bayes classifier; and,
     receive said one or more user profile tags;
  based on and in response to said analyze said communications history and in response to said receive said one or more user profile tags,
   analyze said one or more user profile tags and said communication to determine whether any promotion of said one or more promotions should be provided to the user,
    wherein when the one or more user profile tags do not contain tags relevant to any promotions,
     no promotion is selected, or
     a random promotion is selected to assist with machine learning,
    wherein when the one or more user profile tags do contain tags relevant to said any promotions,
     select a specific promotion from said one or more promotions; and,
   transmit said specific promotion to said user.

11. The multi-stage content analysis system of claim 10, wherein said one or more user profile tags comprise one or more affiliations of said user with an organization, group, cause, or belief.

12. The multi-stage content analysis system of claim 11, wherein said organization, group, cause, or belief comprises a religion.

13. The multi-stage content analysis system of claim 11, wherein said organization, group, cause, or belief comprises a political party, a political viewpoint, or a political candidate.

14. The multi-stage content analysis system of claim 10, wherein said one or more user profile tags comprise one or more life cycle stages associated with said user.

15. The multi-stage content analysis system of claim 14, wherein said one or more life cycle stages comprise one or more of teenager, prospective student, student, new graduate, early adult, expectant spouse, new spouse, expectant new parent, new parent, expectant empty nester, empty nester, senior, grandparent, expectant retiree, and retiree.

16. The multi-stage content analysis system of claim 10, wherein said computer is further configured to:
    access an external database of user profile information;
    modify or extend said one or more user profile tags based on said external database.

17. The multi-stage content analysis system of claim 10, further comprising:
    a machine learning engine configured to
        receive data describing one or more of
            whether said user responded to said specific promotion that was transmitted to said user;
            how said user responded to said specific promotion;
            purchases, subscriptions, or enrollments made by said user; and,
        execute a machine learning algorithm on said data.

18. The multi-stage content analysis system of claim 17, wherein
    said machine learning algorithm is configured to modify said key words and phrases associated with one or more of said set of one or more tags.

* * * * *